United States Patent [19]
Liao

[11] Patent Number: 5,685,660
[45] Date of Patent: Nov. 11, 1997

[54] COLLAPSIBLE FRAME ASSEMBLY

[75] Inventor: Gordon Liao, Yung Kang, Taiwan

[73] Assignee: Unique Product & Design Co., Ltd., Tainan Hsien, Taiwan

[21] Appl. No.: 649,383

[22] Filed: May 16, 1996

[51] Int. Cl.$^6$ .................................................. F16C 11/00
[52] U.S. Cl. ................................................ 403/102; 403/327
[58] Field of Search ....................... 403/102, 326, 403/327; 482/142, 908

[56] References Cited

U.S. PATENT DOCUMENTS

| | | | |
|---|---|---|---|
| 2,204,536 | 6/1940 | Haupt | 403/102 X |
| 2,649,104 | 8/1953 | Militano | 403/102 X |
| 2,763,506 | 9/1956 | Denker et al. | 403/102 X |
| 3,187,373 | 6/1965 | Fisher | 403/102 X |
| 3,801,208 | 4/1974 | Bourgraf et al. | 403/102 X |
| 4,393,541 | 7/1983 | Hujsak et al. | 403/102 X |
| 4,634,127 | 1/1987 | Rockwell | 482/908 X |
| 4,881,776 | 11/1989 | Wang | 403/102 X |
| 5,217,315 | 6/1993 | Rosane | 403/102 |
| 5,348,524 | 9/1994 | Grant | 482/908 X |
| 5,380,113 | 1/1995 | Boehm | 403/102 |
| 5,474,404 | 12/1995 | Chien | 403/102 |
| 5,496,054 | 3/1996 | Wu | 403/102 X |
| 5,611,634 | 3/1997 | Wang | 403/102 |

FOREIGN PATENT DOCUMENTS 1395041  3/1965  France .................................. 403/102

*Primary Examiner*—Anthony Knight
*Assistant Examiner*—Bruce A. Lev
*Attorney, Agent, or Firm*—Pro-Techtor International

[57] ABSTRACT

A collapsible frame assembly comprises a first frame, a second frame, a first coupler disposed at an end of the first frame, and a second coupler disposed at an end of the second frame. Two angle plates are extended from two sides of a distal end of the first coupler. A press plate is extended from the distal end of the first coupler and positioned between two angle plates. A snap hole is formed on the press plate. A sleeve is inserted in the spacing between two angle plates. Two wing lugs are extended from two sides of a distal end of the second coupler to match the corresponding angle plates. A lower portion of a snap button is inserted in the second coupler and the second frame to match the corresponding snap hole. An inner block is inserted in the second frame to surround the lower portion of the hollow snap button closely. A spring is inserted in the snap button. The second coupler is positioned beneath the press plate. A rivet passes through two wing lugs, two washers, two angle plates and the sleeve. The snap button is inserted in the snap hole.

1 Claim, 7 Drawing Sheets

COLLAPSIBLE FRAME ASSEMBLY

BACKGROUND OF THE INVENTION

The invention relates to a collapsible frame assembly. More particularly, the invention relates to a collapsible frame assembly for a golf trolley and a running exerciser.

There are many types of collapsible frame devices. The collapsible frame devices can be disposed on all kinds of pushcarts such as strollers and golf trolleys. The collapsible frame devices can be disposed on many kinds of exercisers such as running exercisers and rowing exercisers.

Referring to FIG. 1, a first conventional collapsible frame device comprises the first frame 1, the second frame 2, and a positioning plate 21 connected to both the first frame 1 and the second frame 2. A fixed plate 11 is disposed on the first frame 1. A sliding plate 12 is disposed on the second frame 2. A slide rail 110 is formed on the first frame 1. The sliding plate 12 is slided on the slide rail 110. The user has to pull up the sliding plate 12 with one hand and hold the first frame 1 with the other hand. When the sliding plate 12 disengages from the fixed plate 11, the first frame 1 can be folded. However, the user has to use two hands at the same time. A portion of the first frame 1 and a portion of the second frame 2 are overlapped, so the first frame 1 and the second frame 2 should be longer than the predetermined lengths.

Referring to FIG. 2, another conventional collapsible frame device comprises the first frame 1', the second frame 2', and a positioning plate 22' connected to both the first frame 1' and the second frame 2'. A retaining plate 13 is fastened on the first frame 1' pivotally. A spring 14 is disposed in the retaining plate 13. The user has to press down the retaining plate 13 with one hand and hold the first frame 1' with the other hand. The fastening condition between the second frame 2' and the retaining plate 13 is not steady. Thus the retaining plate 13 may not fasten the second frame 2' steadily after a long period of usage. Furthermore, a portion of the first frame 1' and a portion of the second frame 2' are overlapped so that the first frame 1' and the second frame 2' should be longer than the predetermined lengths.

Referring to FIG. 3, a third conventional collapsible frame device comprises the first frame 1", the second frame 2", the first fixed plate 15 disposed on the first frame 1", and the second fixed plate 23 disposed on the second frame 2". A lobe 16 is disposed on the first fixed plate 15. A lug 24 is disposed on the second fixed plate 23. The lobe 16 and the lug 24 are fastened by a pin 25 pivotally. A hook 17 is disposed on the first fixed plate 15. A retaining ring 27 and a press plate 26 are disposed on the second fixed plate 23. The retaining ring 27 and the hook 17 are joined together, and the press plate 26 is pressed down. It is difficult to move the press plate 26 while the pivotal connection between the retaining ring 27 and the press plate 26 is very tight. If the pivotal connection between the retaining ring 27 and the press plate 26 is loosened after a long period of usage, the retaining ring 27 and the hook 17 may not joined stably.

SUMMARY OF THE INVENTION

An object of the present invention is to provide a collapsible frame assembly which can be operated easily.

Accordingly, a collapsible frame assembly comprises a first frame, a second frame, a first coupler disposed at an end of the first frame, and a second coupler disposed at an end of the second frame. A first and second opposite angle plates are extended from two sides of a distal end of the first coupler, respectively. A press plate is extended from the distal end of the first coupler and positioned between the first and second angle plates. A snap hole is formed on the press plate. A sleeve is inserted in the spacing between the first and second angle plates. A first and second opposite wing lugs are extended from two sides of a distal end of the second coupler, respectively, to match the corresponding first and second angle plates. A lower portion of a hollow snap button is inserted in a top of the second coupler and the second frame to match the corresponding snap hole. An inner block is inserted in an interior of the second frame to surround the lower portion of the hollow snap button closely. A chamber is formed in an interior of the hollow snap button. A spring is inserted in the chamber. The second coupler is positioned beneath the press plate. A rivet passes through the first wing lug, a first washer, the first angle plate, the sleeve, the second angle plate, a second washer, and the second wing lug. The hollow snap button is inserted in the snap hole. The hollow snap button is pressed down so that the press plate disengages from the hollow snap button. The first coupler is rotated toward the second coupler.

DETAILED DESCRIPTION OF THE INVENTION

Figure 3:
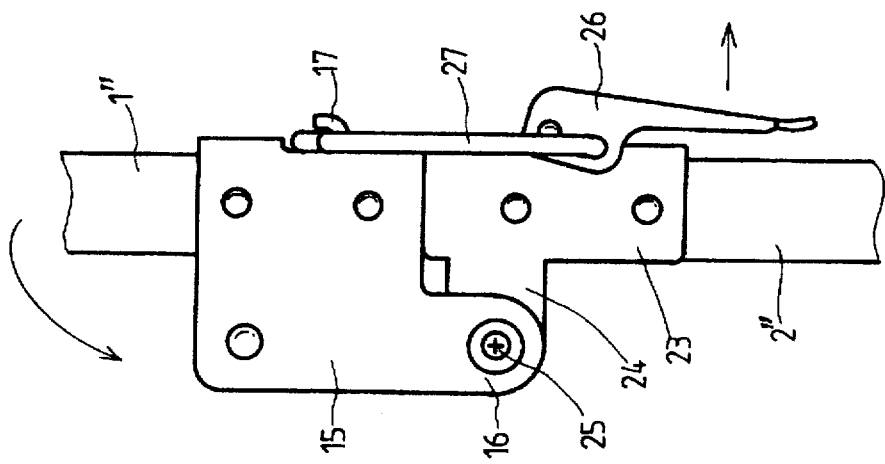
FIG. 3 is a schematic view of a third conventional collapsible frame device of the prior art.
Figure 2:
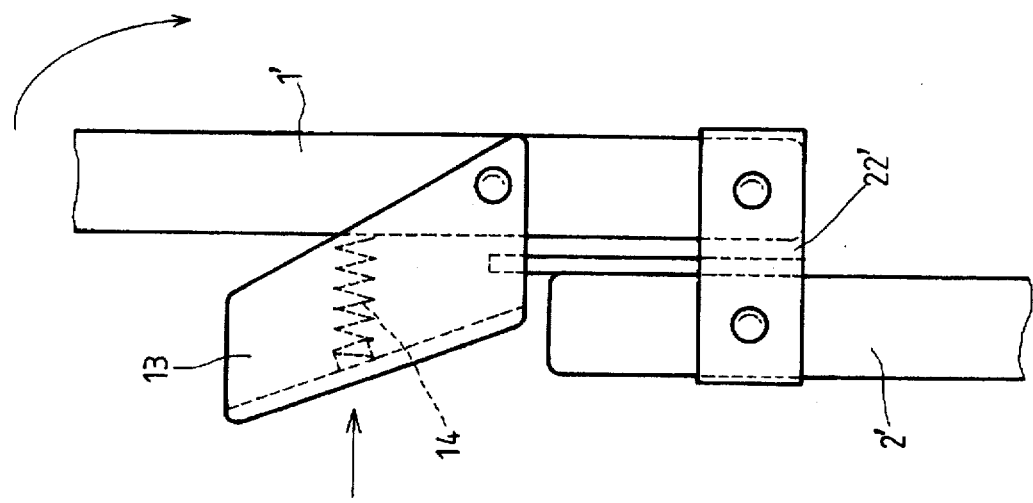
FIG. 2 is a schematic view of a second conventional collapsible frame device of the prior art.
Figure 1:
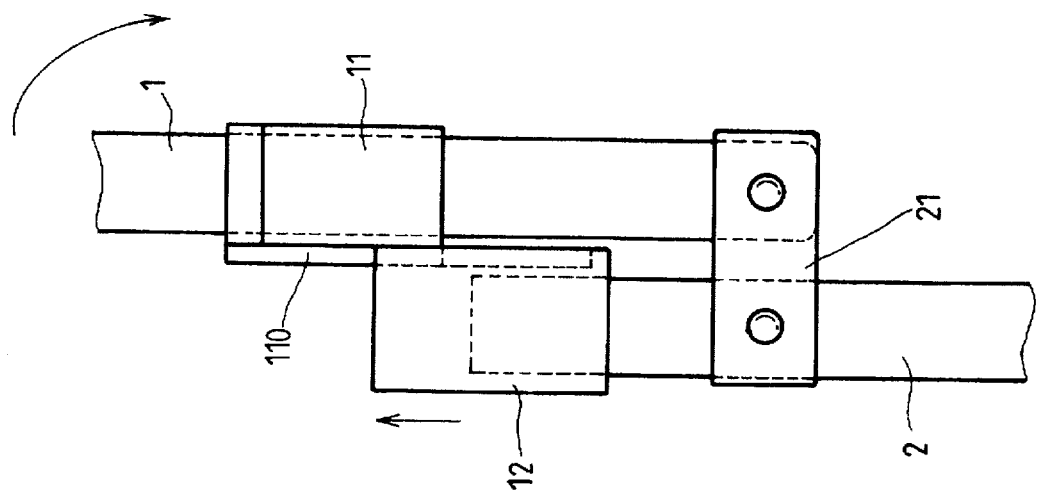
FIG. 1 is a schematic view of a first conventional collapsible frame device of the prior art.
Figure 4:
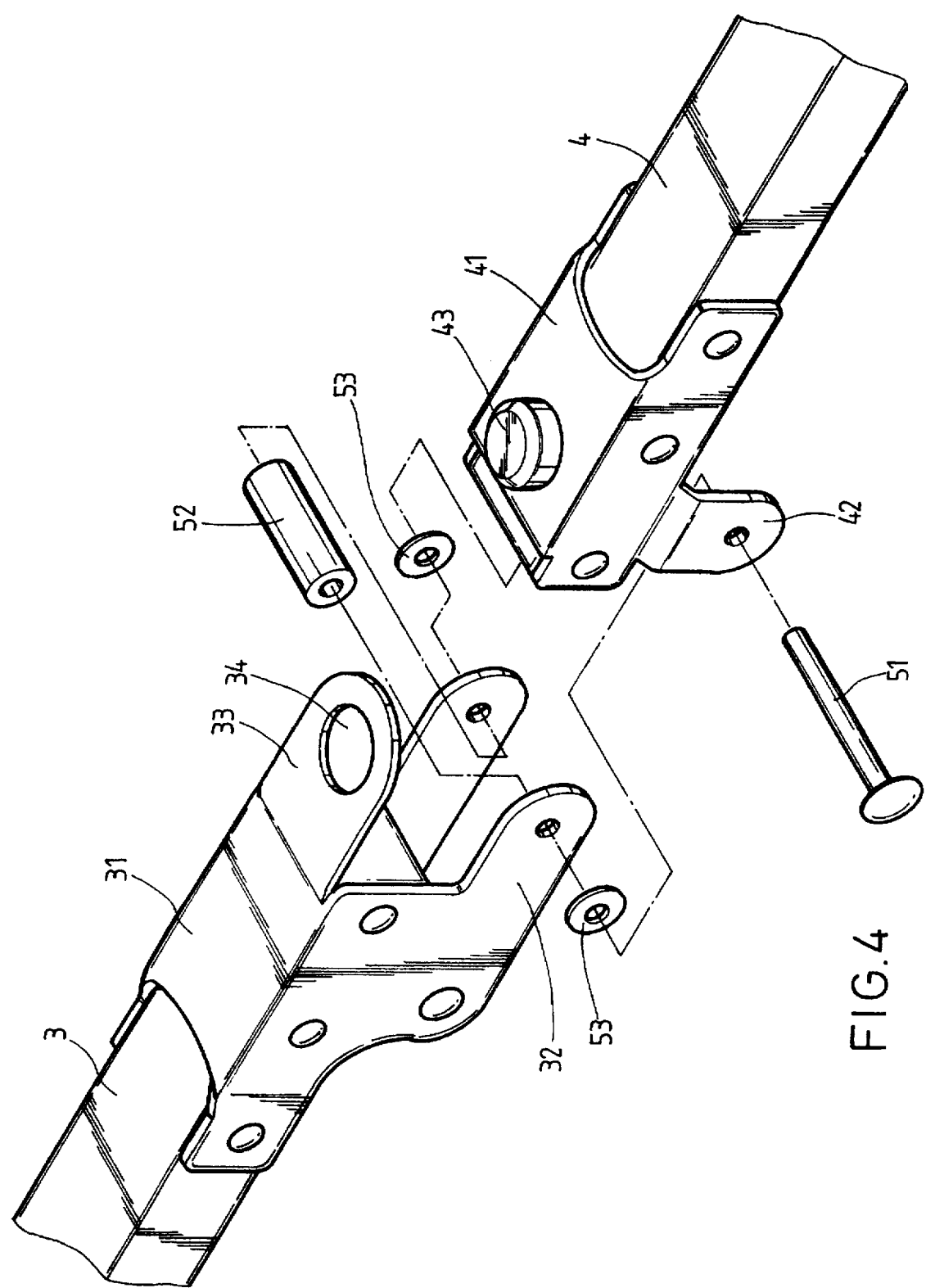
FIG. 4 is a perspective exploded view of a collapsible frame assembly of a preferred embodiment in accordance with the invention.
Figure 5:
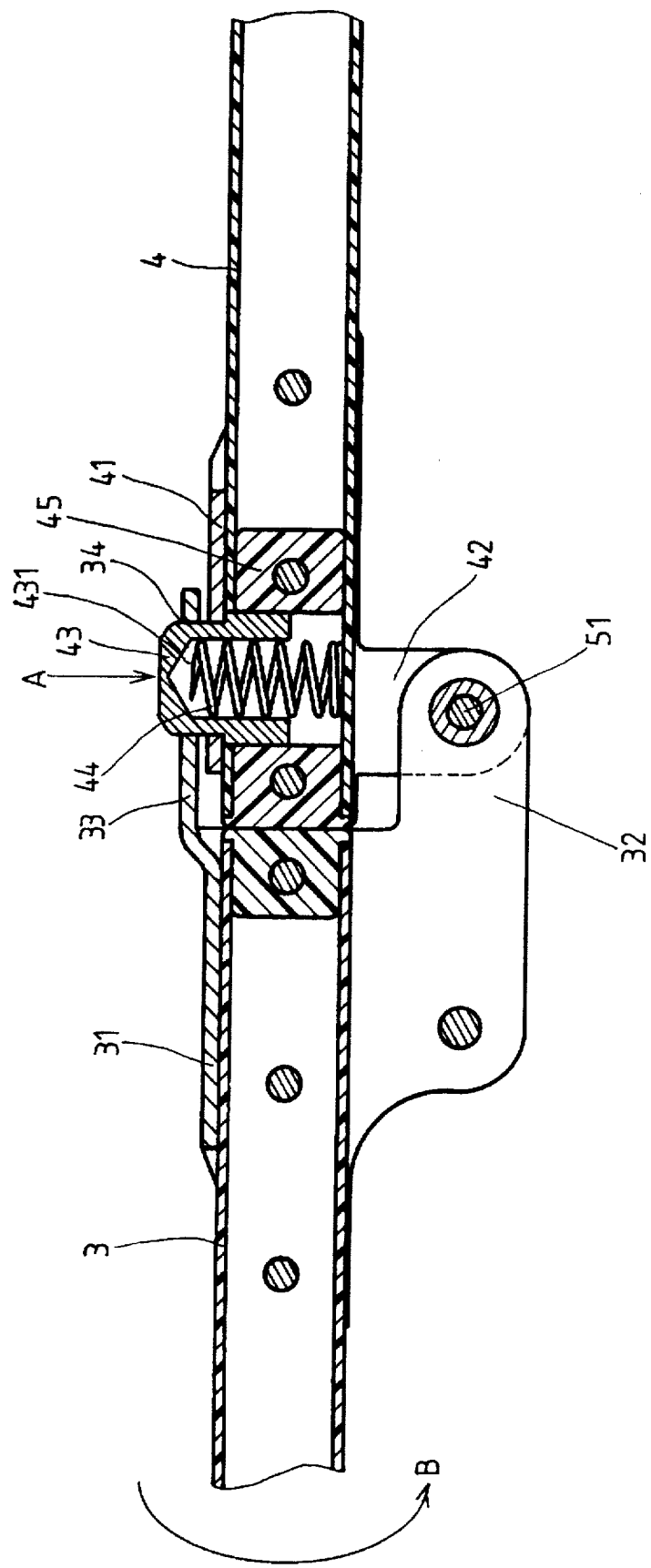
FIG. 5 is a sectional assembly view of a collapsible frame assembly of a preferred embodiment in accordance with the invention while the collapsible frame assembly is extended.
Figure 6:
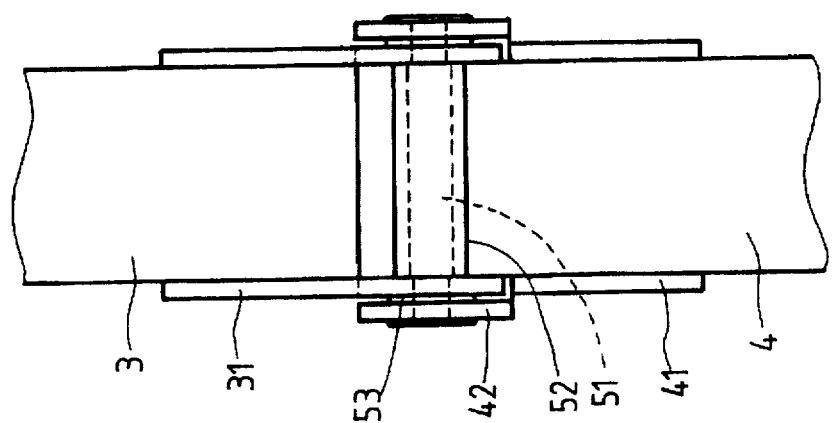
FIG. 6 is a rear elevational view of FIG. 5.
Figure 7:
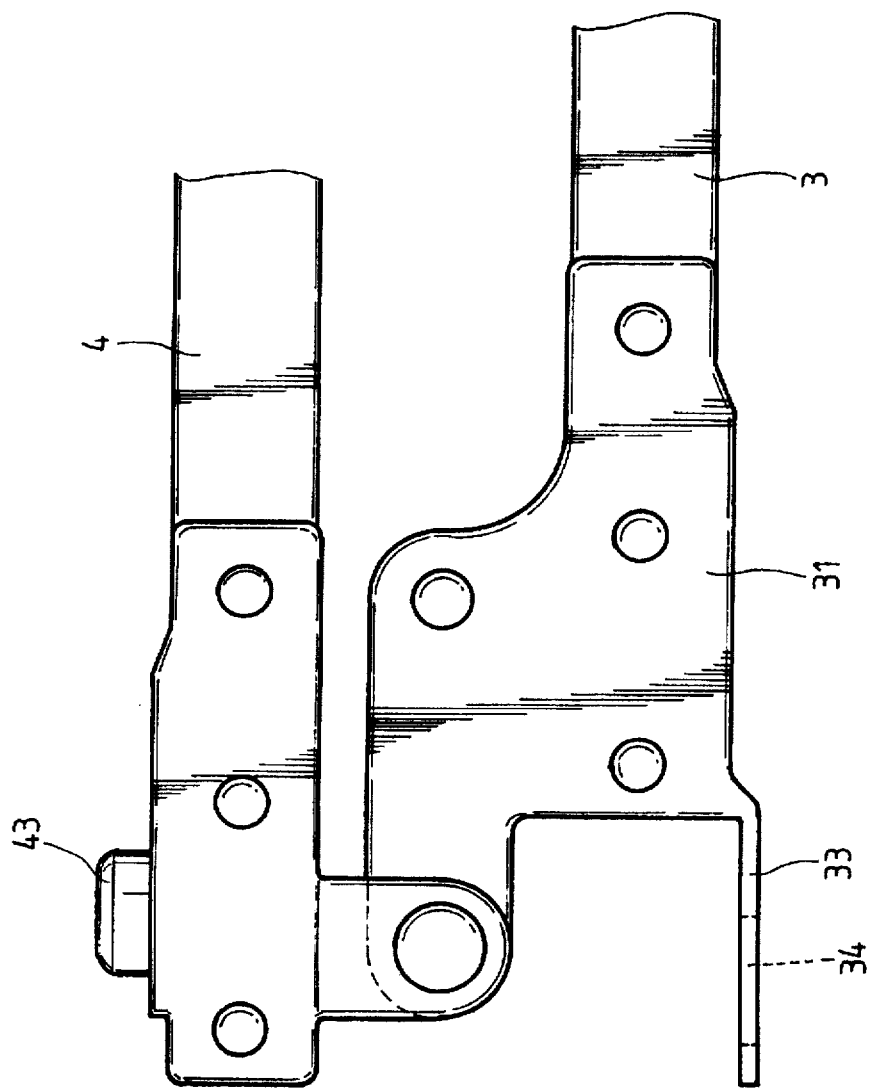
FIG. 7 is a side elevational view of a collapsible frame assembly of a preferred embodiment in accordance with the invention while the collapsible frame assembly is folded.
Figure 8:
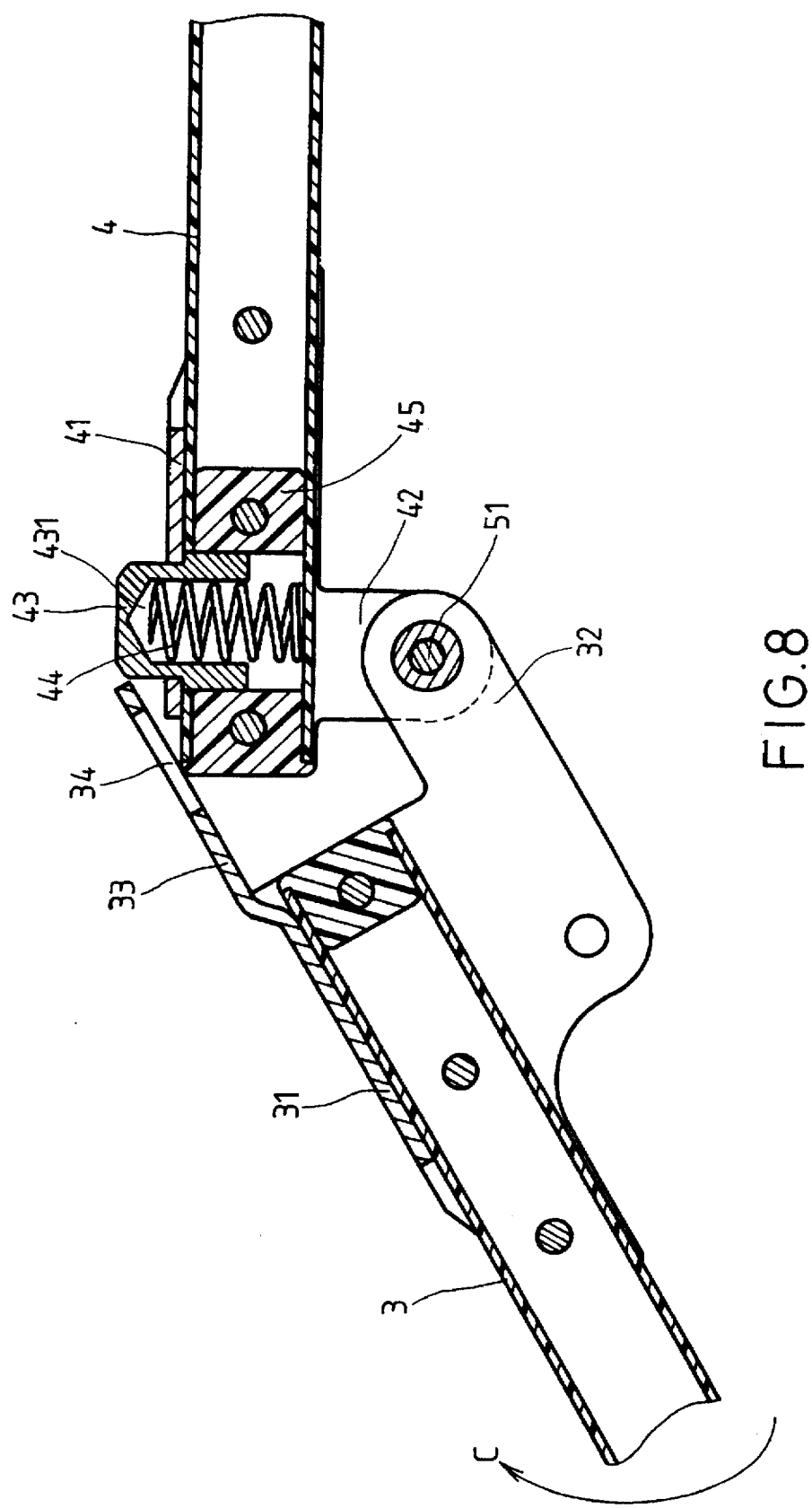
FIG. 8 is a schematic view illustrating the operation of a collapsible frame assembly.

Referring to FIGS. 4 and 5, a collapsible frame assembly comprises a first frame 3, a second frame 4, a first coupler 31 disposed at an end of the first frame 3, and a second coupler 41 disposed at an end of the second frame 4. A first and second opposite angle plates 32 are extended from two sides of a distal end of the first coupler 31, respectively. A press plate 33 is extended from the distal end of the first coupler 31 and positioned between the first and second angle plates 32. A snap hole 34 is formed on the press plate 33. A sleeve 52 is inserted in the spacing between the first and second angle plates 32. A first and second opposite wing lugs 42 are extended from two sides of a distal end of the second coupler 41, respectively, to match the corresponding first and second angle plates 32. A lower portion of a hollow snap button 43 is inserted in a top of the second coupler 41 and the second frame 4 to match the corresponding snap hole 34. An inner block 45 is inserted in an interior of the second frame 4 to surround the lower portion of the hollow snap button 43 closely. A chamber 431 is formed in an interior of the hollow snap button 43. A spring 44 is inserted in the chamber 431. The second coupler 41 is positioned beneath the press plate 33. A rivet 51 passes through the first wing lug 42, a first washer 53, the first angle plate 32, the sleeve 52, the second angle plate 32, a second washer 53, and the second wing lug 42. The hollow snap button 43 is inserted in the snap hole 34.

Referring to FIGS. 5 to 8, the hollow snap button 43 is pressed down so that the press plate 33 disengages from the hollow snap button 43. The first coupler 31 is rotated toward the second coupler 41.

Figure 9:
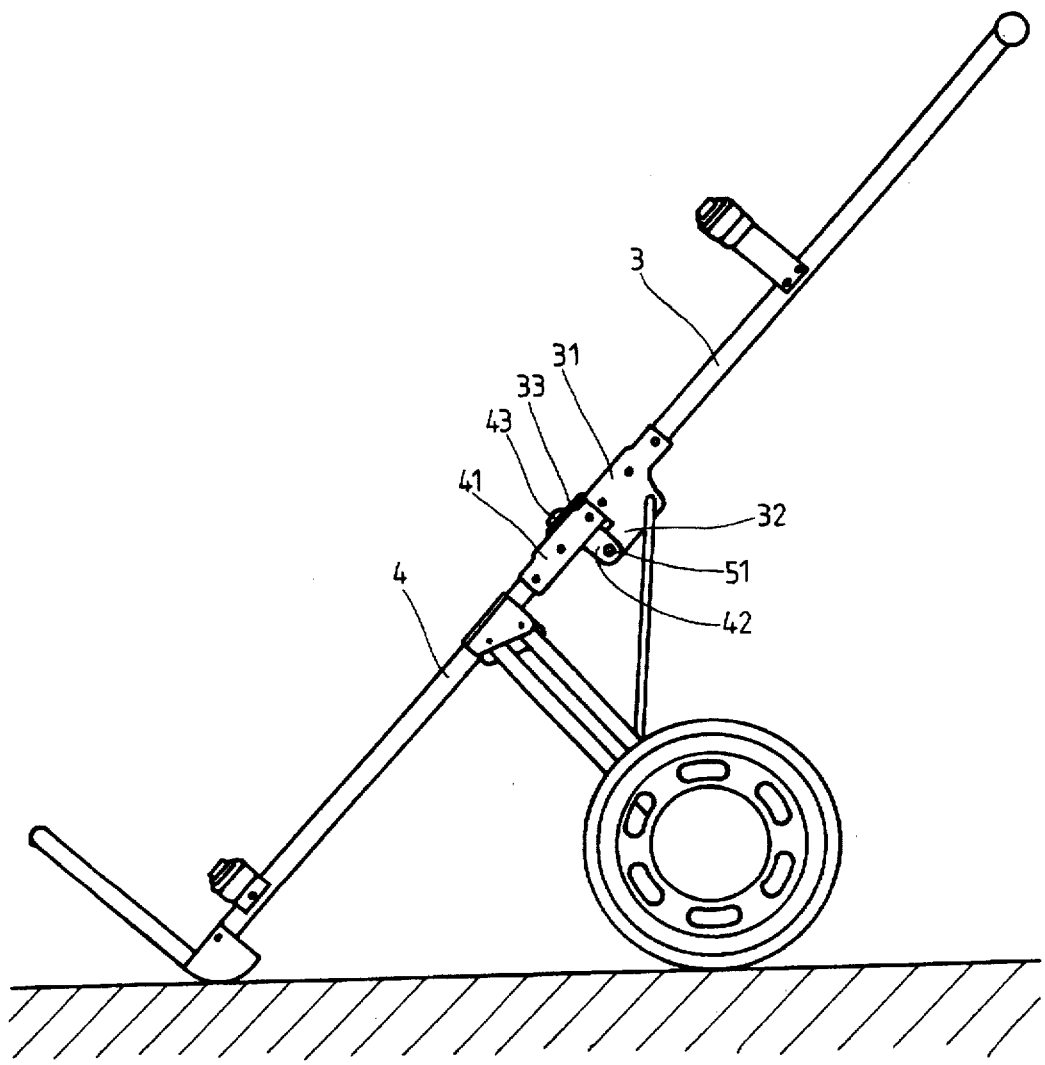
FIG. 9 is a side elevational view of a golf trolley.

Referring to FIG. 9, the collapsible frame assembly can connect the first frame 3 and the second frame 4 of a golf trolley.

Figure 10:
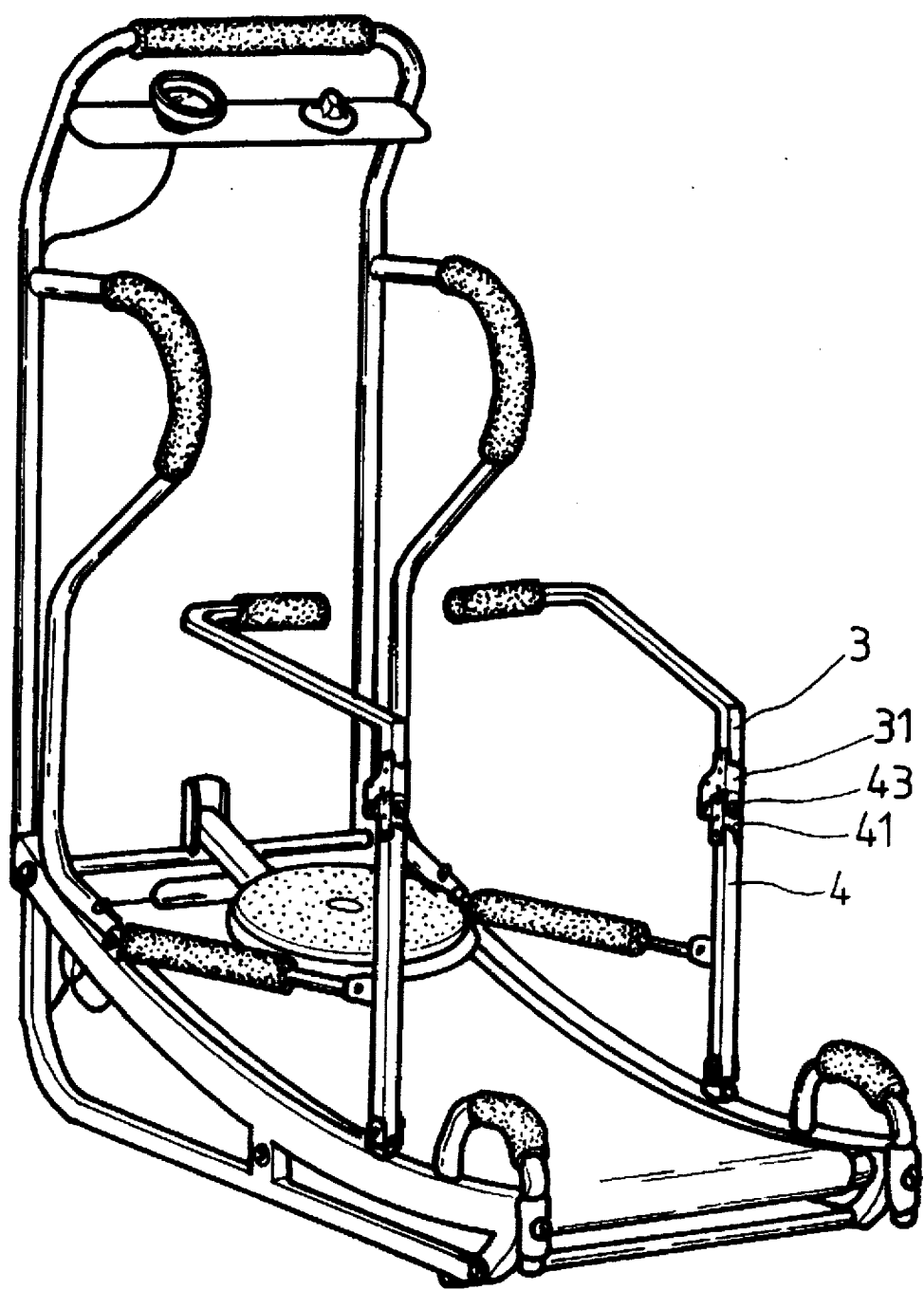
FIG. 10 is a perspective assembly view of a running exerciser.

Referring to FIG. 10, the collapsible frame assembly can connect the first frame 3 and the second frame 4 of a running exerciser.

The invention is not limited to the above embodiment but various modification thereof may be made. Further, various changes in form and detail may be made without departing from the scope of the invention.

I claim:

1. A collapsible frame assembly comprising:

a first frame;

a second frame;

a first coupler disposed at an end of said first frame;

a second coupler disposed at an end of said second frame;

first and second opposite angle plates extended from two sides of a distal end of said first coupler, respectively;

a press plate extended from said distal end of said first coupler and positioned between said first and second angle plates;

a snap hole formed on said press plate;

a sleeve inserted in a spacing between said first and second angle plates;

first and second opposite wing lugs extended from two sides of a distal end of said second coupler, respectively, to match said corresponding first and second angle plates;

a lower portion of a hollow snap button inserted in a top of said second coupler and said second frame to match said corresponding snap hole;

an inner block inserted in an interior of said second frame to surround said lower portion of said hollow snap button closely;

a chamber formed in an interior of said hollow snap button;

a spring inserted in said chamber;

said second coupler positioned beneath said press plate;

a rivet passing through said first wing lug, a first washer, said first angle plate, said sleeve, said second angle plate, a second washer, and said second wing lug;

said hollow snap button inserted in said snap hole;

wherein said hollow snap button is pressed down so that said press plate disengages from said hollow snap button, and said first coupler is rotated toward said second coupler.

* * * * *